United States Patent Office 3,650,996
Patented Mar. 21, 1972

3,650,996
WATER-DILUTABLE COATING COMPOSITIONS CONTAINING PHENOL RESOLS ETHERIFIED
Rolf Guldenpfennig, Dossenheim, Germany, assignor to Reichhold-Albert-Chemie Aktiengesellschaft, Hamburg-Wondsbek, Germany
No Drawing. Continuation of abandoned application Ser. No. 661,558, Aug. 18, 1967. This application Dec. 4, 1970, Ser. No. 95,384
Claims priority, application Germany, Sept. 9, 1966, R 44,090
Int. Cl. C08g 45/08
U.S. Cl. 260—20                               8 Claims

ABSTRACT OF THE DISCLOSURE

A water-dilutable heat-curable coating composition comprising:
(I) 50 to 99 percent by weight of hydrophilic plasticizing epoxy resin partial esters selected from the group consisting of:
  (1) the partial esters of compounds containing epoxy groups or hydroxyl groups produced by hydrolytic dissociation of said epoxy groups with at least one monocarboxylic acid and a polybasic carboxylic acid;
  (2) the partial esters of compounds containing epoxy groups or hydroxyl groups produced by hydrolytic dissociation of said epoxy groups with a polybasic carboxylic acid; and
  (3) a mixture of (1) and (2);
  wherein said polybasic carboxylic acid comprises adducts selected from the group consisting of maleic acid with fatty acids and maleic anhydride with fatty acids, said fatty acids are selected from the group consisting of drying oil acids, semi-drying oil acids, and mixtures of said oils with rosin acids, said fatty acids containing unsaturated monocarboxylic acids, the molar proportion of unsaturated monocarboxylic acid to maleic acid or maleic anhydride is between about 0.9:1 and 1.1:1 and said compounds containing epoxy groups or hydroxyl groups are epoxy resins having the general formula

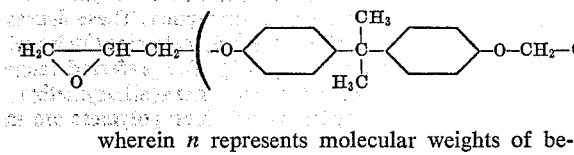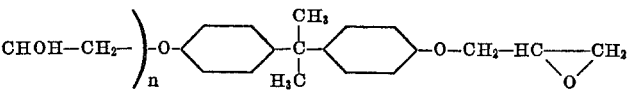

wherein $n$ represents molecular weights of between about 380 and 3500;
(II) strong nitrogenous bases to form soaps with the free carboxyl groups;
(III) water; and
(IV) 1 to 50 percent by weight of hydrophilic and water-soluble low molecular weight hardenable aldehyde condensation products such as etherified phenol resols alone or in combination with phenol resols and/or aminoplast-forming resins.

CROSS-REFERENCES TO RELATED APPLICATIONS

This application is a continuation of Ser. No. 661,558, filed Aug. 18, 1967.
Applicant incorporates by reference his copending U.S. applications Ser. No. 459,433, filed May 27, 1965, entitled "Water-Dilutable Heat-Curable Lacquer Compositions"; now U.S. Pat. 3,481,890 Ser. No. 459,434, filed May 27, 1965, entitled "Water-Dilutable Heat-Curable Lacquer Compositions," now abandoned; and Ser. No. 532,866, filed Mar. 7, 1966, and entitled "Water-Dilutable Compositions and Lacquer Binders," now abandoned.

BACKGROUND OF THE INVENTION

The field of the invention is coating compositions containing fat, fatty oil, fatty oil acid or salts thereof.
This invention relates to coating compositions of the kind described in applications Ser. Nos. 459,433, 459,434 and 532,866, which consist of at least one and possibly several plasticized hydrophilic synthetic resins containing free carboxyl and hydroxyl groups, ammonia and/or a strong organic nitrogen base and water. The resins are prepared either by esterifying epoxy compounds containing epoxy groups, or hydroxyl-groups or such polyhydroxy compounds which are derived by hydrolytic decomposition directly from the epoxy-group containing compounds, with monobasic or polybasic carboxylic acids, or by esterifying epoxy compounds containing epoxy groups, possibly hydroxyl groups or such polyhydroxyl compounds as are derived by hydrolytic decomposition directly from the epoxy containing compounds, with polybasic carboxylic acids.
The coating compositions may also contain thermosetting, water-soluble or at least hydrophilic low molecular weight aldehyde condensation products prepared in a known manner from phenols and/or phenol-carboxylic acids and formaldehyde. According to application Ser. No. 532,866, the aldehyde condensation products are phenol resols obtained from the reaction of formaldehyde with phenol or phenol carboxylic acids and aminoplast resins obtained from methanol-etherified polymethylol amines with 4 to 6 moles formaldehyde per mole melamine.

SUMMARY OF THE INVENTION

Having particularly in mind the coating compositions pertaining to phenol resols, it is an object of the present invention to add thereto etherified phenol resols.
It is another object of the present invention to replace the phenol resols of the compositions disclosed in application Ser. No. 532,866 with etherified phenol resols.

Upon further study of the specification and claims, other objects and advantages of the present invention will become apparent.
In a further development of the prior coating compositions disclosed in application Ser. No. 532,866, it has been found that they are improved by being made to contain, in addition to or instead of the phenol resols, phenol resols and especially alkyl phenol resols, which have been etherified with monovalent aliphatic alcohols with one to four carbon atoms, such as methanol, ethanol, propanol and butanol, preferably methanol. The combination of epoxy resin partial esters with etherified phenol resols in the coating composition has the advantage of greater storage stability of the water containing coating compositions and of greater corrosion resistance of the baked films. The prior art phenol resols and the phenol carboxylic acid resols, preferably p-tert.-butyl phenol resol, are used for etherification in the preparation of the coating composition. The degree of etherification and the etherified phenol resols in the coating composition is such as to produce homo-films after the coating. The proportions of epoxy resin partial ester and thermosetting condensation products, especially with etherified phenol resols, in these coating compositions lie between 1 and 50% by weight, preferably between 5 and 35%, based on the solid resin.

DESCRIPTION OF THE PREFERRED EMBODIMENTS

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Phenolresols used in the present invention are: thermosetting, hydrophilic, low molecular condensation products as phenol alcohols and phenolpolyalcohols that mean low molecular still by condensation of one or more nuclear phenols with aldehydes as formaldehyde, acetaldehyde, crotonaldehyde, acroleine, benzaldehyde, furfurol, etc., or formaldehyde supplying compounds such as paraformaldehyde, paraldehydedetrioxymethylene. The preferred aldehyde is formaldehyde. Suitable phenols are phenol in the ortho, ortho-para-position, substituted yet still condensable phenols such as cresol, xylenol. Especially suitable are resols obtained from alkyl phenols such as propyl, butyl and especially para-tert.butylphenol. Furthermore suitable are resols from binuclear phenols such as diphenol, bisphenol A and especially if per mol phenol about 1.75 up to 2.5 mol formaldehyde have been used. When applying the resols, it is recommended that a small amount of a strongly hydrophilic solvent, such as ethylglycol, diethyl glycol, propyl glycol, isopropyl glycol, butyl glycol be used.

Resols of phenol carboxylic acids are preferably used, which are obtained by condensation of formaldehyde or formaldehyde supplying compounds with suitable phenol carboxylic acids. Among the phenol carboxylic acids condensable with formaldehyde the 4,4-bis-(4-hydroxyphenyl)-valerianic acid occupies a preferred position. Here too, the most advantageous results are obtained when 1.75 to 2.5 mol formaldehyde are combined per mol of diphenol acid. It is recommended to neutralize the phenol carboxylic acid resols preferably with ammonia before mixing with the plasticizing component I, respectively. The production of other suitable phenol carboxylic acid resols is described, e.g. in the German document laid open to public inspection No. 1,113,775.

Thermosetting, hydrophilic, low molecular condensation products forming aminoplasts are also aldehyde reaction products of compounds reactable with aldehydes, such as urea, ethylene urea, dicyanide diamine and aminotriazine, such as melamine, benzguanamine, acetguanamine and formguanamine. The above mentioned compounds can be reacted with aldehyde, such as formaldehyde, acetaldehyde, crotonaldehyde, acroleine, benzaldehyde, furfurol and the like. By aldehydes also aldehyde-forming compounds, such as paraformaldehyde, paraldehyde and trioxymethylene should be understood. A preferred aldehyde is formaldehyde. The preferred aldehyde neutralizing compounds are melamine and urea. The reaction is effected in the usual mol-proportions, i.e. with urea resins in a usual formaldehyde mol-proportion of 1:1.5 to 1:4, with melamine resins in a formaldehyde mol-proportion of 1:1.5 to 1:6. The nitrogen containing polyalcohols are preferably applied in partially or completely alkylated or alcohol modified form.

The esterification products of the lowest semi-ethers of glycol and diglycol, such as ethylene glycol, ethylene diglycol with the methylol melamines have also proved useful in the present case, such as those already disclosed in the Austrian Pat. specification 180,407.

A preferred embodiment of the present invention has low molecular condensation products of the melamine with formaldehyde with a melamine formaldehyde proportion of 1:4 to 1:6, which has been completely etherified with methanol. Also suitable are ethers partially esterified with dicarboxylic acids of polymethylol compounds containing nitrogen, such as are obtained by alcoholysis of hexamethoxymethyl melamine with adipic acid. Such condensation products are used in baking varnishes according to the invention at 5 to 50 weight percent.

As primary material for the etherified phenolresol resins and for the etherified alkyl phenol resols used in the present invention the above-mentioned phenolresols resp. alkyl phenol resols are suitable, however, they have to be etherified with low monovalent aliphatic alcohols such as methanol, ethanol, n-propanol, iso-propanol, n-butanol, iso-butanol.

Production of preliminary product a 45 parts dehydrated castor oil fatty acids,
30 parts talloil fatty acid, and
25 parts maleic anhydride are brought to reaction in the known manner in a flask with agitator and cooler under inert gas at 180 to 220° C., until no more than 3% of the amount of maleic anhydride used are free. Hydrolyzation is then effected by adding 5 parts water and by maintaining the product at 100° C. for two hours.

Production of phenol resol 1

60 parts of p-tert.-butyl phenol and
80 parts aqueous formaldehyde solution (30%)

are reacted together under the action of strong lyes at about 40° C. in the known manner, until the contents of free formaldehyde have decreased to about 0. With strong acids, the resol is neutralized and washed with water to be salt-free.

Preparation of the epoxy resin partial ester 1

600 parts of an epoxy resin obtained in the known manner by reacting bisphenol-A with epichlorhydrin in the presence of alkali, having a melting point of 64 to 76° C., an epoxy equivalent weight of 450 to 525 and a molecular weight of approximately 900 are reacted in a suitable reaction container equipped with an agitator, a cooler and thermometer, with 740 parts of preliminary product a. The acid number of the mixture is then determined, and the preparation is maintained at about 120° C., until the acid number has fallen by approximately one-third. As soon as the acid number has been reached, 140 parts butyl glycol and 150 parts ethyl glycol are added.

Preparation of the epoxy resin partial ester 2

300 parts of an epoxy resin obtained in the known manner by reacting bisphenol-A with epichlorhydrin in the presence of alkali, having a melting point of 20 to 28° C., an epoxy equivalent weight of 225 to 290 and a molecular weight of approximately 470 are esterified in a suitable reaction container equipped with an agitator, a cooler and thermometer, with 330 parts linseed oil fatty acids to an acid number of below 2. As soon as this value has been reached, the preparation is cooled to about 100° C. and 300 parts of preliminary product a (acid number 310 to 340) are added. After short agitation, the acid number is determined and a temperature of 100 to 145° C. is then maintained until the acid number has fallen by about one-third of the value of the mixture.

Preparation of etherified phenol resol A 500 parts p-tert.-butyl phenol resol 1 are reacted with such amounts of methanol that the water content of the reaction mixture, based on the methanol, is no more than 20%. The pH is then brought to about between 2 and 1 with sulfuric acid, and the mixture then heated about 2 to 3 hours to 60° C. The solids content of a neutralized sample has now increased about 2 to 3%. The material is then neutralized with soda lye and the methanol and water distilled under vacuum, without passing above a temperature of 60° C. The reaction mixture is washed twice with distilled water in order to eliminate the salts. By adding water, the solids content is brought down to 60%.

Preparation of the etherified phenol carboxylic acid resol B 700 parts 4,4-bis-(4-hydroxyphenol)-valerianic acid and 1000 parts of aqueous 30% formaldehyde solution are mixed with 300 parts aqueous 40% soda lye. The mixture is kept at 40° C. unitl 3.3 to 3.6 moles formaldehyde per mole of 4,4-bis-(4-hydroxyphenol)-valerianic acid are bound. The mixture is then reacted with 635 parts of a hydrochloric acid solution which was prepared by dilution of concentrated hydrochloric acid with water in the ratio of 1:1 until the aqueous acid solution had a pH between 3 and 4. The precipitated resol is washed once with 200 parts water. The resol has a solids content of 79%. 500 parts of this resol are dissolved in 700 parts methanol and the solution is adjusted to a pH between 2 and 1 by about 22 parts concentrated hydrochloric acid. The mixture is kept between 40 and 45° C. until the water compatibility has dropped to between 1:0.8 and 1:0.9. The water compatibility is determined at 20° C. by adding to 10 g. of the solution just sufficient water to produce an initial turbidity. A water compatibility of 1:0.8 means that for 10 g. of the solution, 8 g. water are necessary to produce turbidity. After the water compatibility has been determined, the solution is neutralized with a 20% solution of soda lye to a pH between 7 and 8, the excess of methanol being distilled off at 25° C. under vacuum. While at room temperature the pH is brought to about 3 by adding hydrochloric acid, and the resin is then washed salt-free with water. The solids content of the resin is now about 70%.

EXAMPLE 1

800 parts of the previously prepared epoxy resin partial ester 1 are diluted with 600 parts water and mixed with aqueous ammonia until the pH of a 20% solution reaches to about 8 to 9. 220 parts of etherified phenol resol A with a solid content of 60% are then added.

EXAMPLE 2

300 parts of the previously prepared epoxy resin partial ester 2 are mixed with 76 parts etherified phenol carboxylic acid resol B, and ethyl glycol is then added to the mixture until its solids content is brought down to 80%. Triethylamine and water are then added until a 20% solution has a pH of 7.8–8.4.

An analysis of a film, which was separated electrophoretically from an aqueous 10% bath of the binder according to example, shows that the phenol resol content corresponds to that of the bath. This binder is, therefore, ideally suitable for electrophoretic application.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:
1. Water-dilutable heat-curable coating compositions comprising the following components:
(I) 50 to 99 percent by weight of hydrophilic plasticizing epoxy resin partial esters selected from the group consisting of:
(1) the partial esters of compounds containing epoxy groups or hydroxyl groups produced by hydrolytic dissociation of said epoxy groups with at least one monocarboxylic acid and a polybasic carboxylic acid;
(2) the partial esters of compounds containing epoxy groups or hydroxyl groups produced by hydrolytic dissociation of said epoxy groups with a polybasic carboxylic acid; and
(3) a mixture of (1) and (2);
wherein said polybasic carboxylic acid comprises hydrolyzed adducts selected from the group consisting of maleic acid with fatty acids and maleic anhydride with fatty acids, said fatty acids are selected from the group consisting of drying oil acids, semi-drying oil acids, and mixtures of said oils with rosin acids, said fatty acids containing unsaturated monocarboxylic acids, the molar proportion of unsaturated monocarboxylic acids to maleic acid or maleic anhydride is between about 0.9:1 and 1.1:1 and said compounds containing epoxy groups or hydroxyl groups are epoxy resins having the general formula

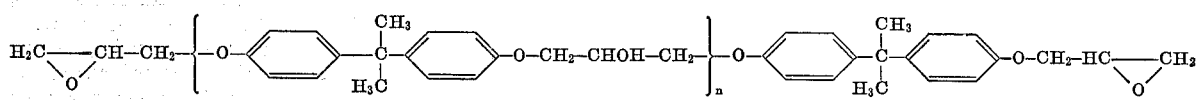

wherein $n$ represents molecular weights of between about 380 and 3500;
(II) strong nitrogenous bases, forming soaps with said hydrophilic, plasticizing epoxy resin partial esters;
(III) water; and
(IV) 1 to 50 percent by weight of hydrophilic to water-soluble low molecular weight hardenable aldehyde condensation products comprising etherified phenol resols.

2. The composition of claim 1, wherein the molar proportion of free hydroxyl groups to free carboxyl groups is between about 1:0.8 and 1:1, wherein one epoxy group is calculated as two hydroxyl groups and one anhydride group is calculated as two carboxyl groups.

3. The composition of claim 1, wherein said phenol resols are alkyl phenol resols.

4. The composition of claim 1, wherein said etherified phenol resols are etherified with monovalent alcohols of 1–4 carbon atoms.

5. The composition of claim 1, further comprising a phenol resol.

6. The composition of claim 5, further comprising an aminoplast.

7. The composition of claim 5, wherein said phenol resol is obtained from the reaction of formaldehyde with a substance selected from the group consisting of phenol and phenol carboxylic acid.

8. The composition of claim 6, wherein said aminoplast resin is a low molecular methanol-etherified polymethylol amine with 4 to 6 moles formaldehyde per mole melamine.

(References on following page)

References Cited

UNITED STATES PATENTS

| | | | |
|---|---|---|---|
| 2,840,542 | 6/1955 | Freeman | 260—52 X |
| 3,355,401 | 11/1967 | Tanner | 260—18 |
| 3,308,077 | 3/1967 | Spalding | 260—18 |
| 3,300,424 | 1/1967 | Hoenel | 260—21 |
| 3,196,117 | 7/1965 | Boller | 260—19 |
| 3,133,032 | 5/1964 | Jen | 260—850 |
| 2,681,894 | 6/1954 | Hoenel | 260—20 |
| 3,567,668 | 3/1971 | Güldenpfennig | 260—29.3 X |
| 3,563,926 | 2/1971 | Lackner | 260—29.3 X |
| 3,481,890 | 12/1969 | Güldenpfennig | 260—842 X |
| 3,390,110 | 6/1968 | Dalibor | 260—842 |
| 2,649,433 | 8/1953 | Hoenel | 260—842 |

FOREIGN PATENTS

| | | |
|---|---|---|
| 233,147 | 9/1963 | Austria. |
| 718,955 | 9/1965 | Canada. |

DONALD E. CZAJA, Primary Examiner

C. W. IVY, Assistant Examiner

U.S. Cl. X.R.

260—18 ep, 19 ep, 21, 29.3, 29.4